United States Patent [19]

Komiya et al.

[11] Patent Number: 4,835,058

[45] Date of Patent: May 30, 1989

[54] PACKING MATERIAL AND PROCESS FOR ITS PRODUCTION

[75] Inventors: Katsuo Komiya, Hikari; Yoshio Kato, Shin-nanyo, both of Japan

[73] Assignee: Tosoh Corporation, Shin-nanyo, Japan

[21] Appl. No.: 121,888

[22] Filed: Nov. 17, 1987

[30] Foreign Application Priority Data

Nov. 17, 1986 [JP] Japan .................. 61-271960

[51] Int. Cl.[4] ............... B32B 9/00; B01D 15/08; B01J 20/10
[52] U.S. Cl. ........................ 428/405; 55/67; 210/198.2; 210/656; 428/403; 428/407; 435/803
[58] Field of Search .............. 210/656, 198.2; 428/403, 405, 407; 55/67; 435/803

[56] References Cited

U.S. PATENT DOCUMENTS

| | | |
|---|---|---|
| 3,795,313 | 3/1974 | Kirkland et al. |
| 4,242,227 | 12/1980 | Nestrick et al. .............. 210/656 |
| 4,415,631 | 11/1983 | Schutizser .................... 428/405 |
| 4,658,000 | 4/1987 | Tyihar et al. ................. 210/656 |
| 4,705,725 | 11/1987 | Glajch et al. ................ 210/656 |

FOREIGN PATENT DOCUMENTS

| | | |
|---|---|---|
| 0155637 | 9/1985 | European Pat. Off. |
| 0161058 | 11/1985 | European Pat. Off. |
| 0181266 | 5/1986 | European Pat. Off. |
| 1456865 | 12/1973 | United Kingdom |

OTHER PUBLICATIONS

Kurganov et al., "High-performance ligand-Exchange Chromatography of Enantiomers" J. Chrom. 261:223-233 (1983).

*Primary Examiner*—George F. Lesmes
*Assistant Examiner*—James B. Monroe
*Attorney, Agent, or Firm*—Cushman, Darby & Cushman

[57] ABSTRACT

A packing material for chromatography comprising a carrier having silanol groups on its surface, wherein Si in the silanol groups forms a Si—O—Si bond together with Si in a silyl group of the following formula I and Si in a silyl group of the following formula II, and the molar ratio of the silyl group of the formula II is from 0 to ⅔ based on the total amount of silyl groups:

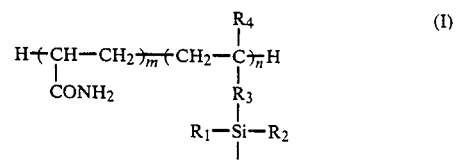

(I)

wherein each of $R_1$ and $R_2$ is a hydroxyl group, a methyl group, an ethyl group, an alkoxy group having from 1 to 3 carbon atoms, a phenoxy group, an acetoxy group, a trimethylsiloxy group, a triethylsiloxy group or an oxygen atom bonded to Si in a silanol group on the surface of the carrier, $R_3$ is a 3-carbonyloxypropyl group, a 1-phenyleneethyl group or a 2-phenyleneethyl group, $R_4$ is a hydrogen atom or a methyl group, and each of m and n is an integer of at least 1; and

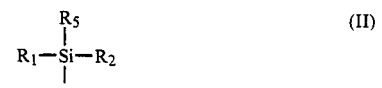

(II)

wherein each of $R^1$ and $R^2$ is a hydroxyl group, a methyl group, an ethyl group, an alkoxy group having from 1 to 3 carbon atoms, a phenoxy group, an acetoxy group, a trimethylsiloxy group, a triethylsiloxy group or an oxygen atom bonded to Si in a silanol group on the surface of the carrier, $R_5$ is a methyl group, an ethyl group or a 3-glyceryloxypropyl group.

8 Claims, 1 Drawing Sheet

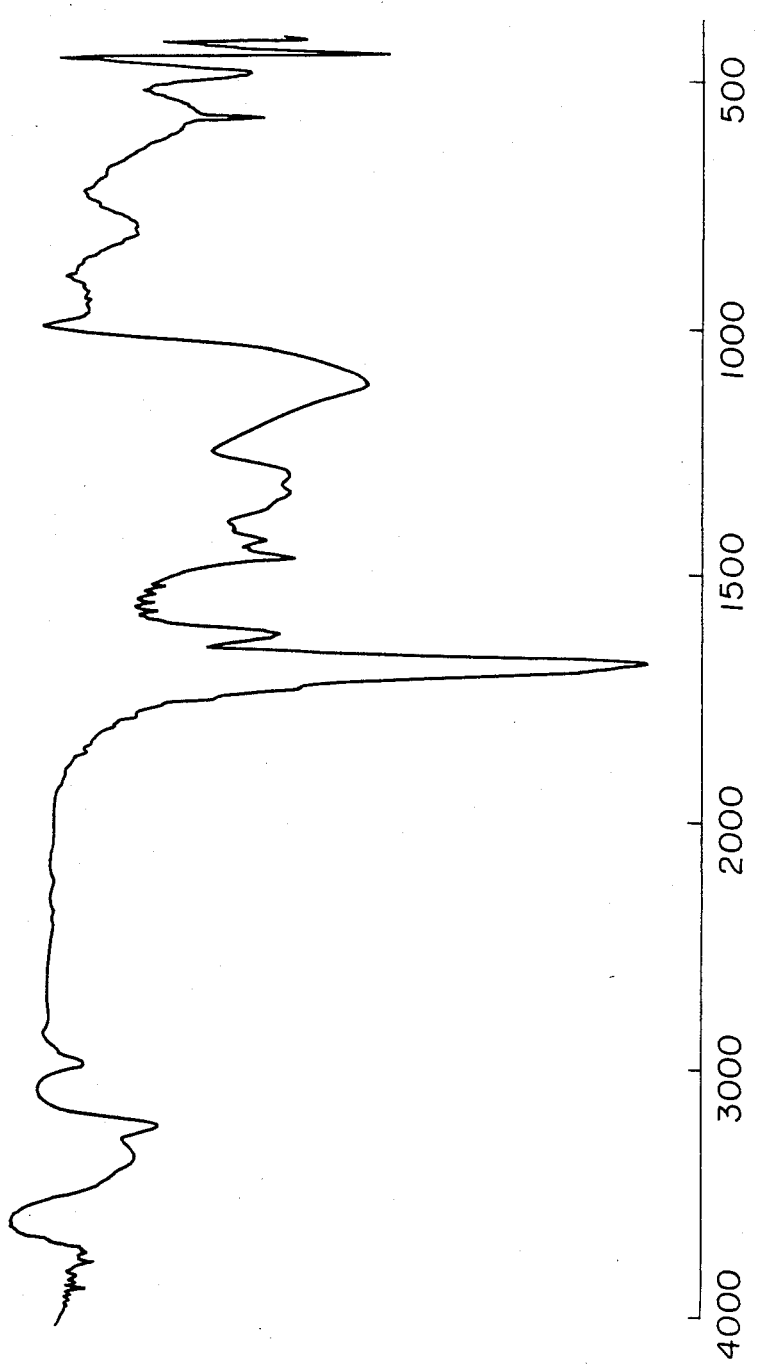

PACKING MATERIAL AND PROCESS FOR ITS PRODUCTION

The present invention relates to a packing material for chromatography. More particularly, it relates to a packing material useful particularly for normal phase partition liquid chromatography and aqueous gel permeation chromatography and a process for its production.

As such a packing material for chromatography, there are two types of packing materials i.e. a packing material of inorganic support such as silica gel or porous glass having e.g. 3-glyceryloxypropyl groups, aminopropyl groups or cyanopropyl groups bonded thereto and an organic polymer packing material such as polysaccharide gel, polyacrylamide gel or ion exchange resin. Both types of packing materials are porous and have a large hydrophilic surface. These packing materials are known to be useful as packing materials for normal phase partition chromatography for the separation of polar substances such as saccharides or alcohols, or as packing materials for aqueous gel permeation chromatography or for hydrodynamic chromatography for the separation of e.g. saccharides, proteins, water-soluble synthetic polymers based on the molecular sizes.

However, these packing materials are not fully satisfactory, particularly in the following respects:

Namely, the packing material of inorganic support (such as silica gel or porous glass), particularly the one having a hydrophilic stationary phase bonded thereto, is inferior in the durability in a water-containing solvent system and tends to lead to a change with time of the eluting amount even during the use under the same condition. This is believed to be attributable to the slight solubility of the inorganic base material such as silica gel in water.

On the other hand, the polymer packing material tends to undergo swelling or contraction depending upon the salt concentration in the solvent, the pH or the composition of organic solvents. Besides, it is inferior in the mechanical strength as compared with an inorganic porous carrier and is hardly useful in the form of fine particles. This is particularly disadvantageous as a packing material for high performance liquid chromatography wherein the use of fine particles is an important factor for the improvement of the resolution. For a packing material for normal phase partition chromatography or gel permeation chromatography in a water-containing solvent system, it is important that in the water-containing solvent system, it is stable and does not lead to a substantial change in the eluting amount, it does not undergo swelling or contraction due to a change of the mobile phase, and it is hard enough to be useful in the form of fine particles and has a hydrophilic stationary phase.

Now, it has been found that by using a hard inorganic carrier as the base material, a silane having vinyl-polymerizable organic groups is chemically bonded to the surface of the carrier, and then acrylamide is copolymerized to the silane-bonded carrier, whereby not only the silane is simply fixed to the inorganic carrier by the chemical bond but also the organic groups of the silane are taken into polymer molecules in the form of a copolymer with an acrylamide polymer, and it is possible to obtain a packing material wherein polymer molecules constituting an organic stationary phase are chemical bonded to the carrier by numerous siloxane bonds. It has been found also that with this packing material, no change with time is observed in normal phase chromatography even in the water-containing solvent system, separation based on the molecular sizes can be conducted by aqueous gel permeation chromatography, and it is possible to obtain a chromatogram having no substantial change with time. Thus, it has been possible to thereby solve the above-mentioned problems, and the present invention has been accomplished on the basis of these discoveries.

The present invention provides a packing material for chromatography comprising a carrier having silanol groups on its surface, wherein Si in the silanol groups forms a Si—O—Si bond together with Si in a silyl group of the following formula I and Si in a silyl group of the following formula II, and the molar ratio of the silyl group of the formula II is from 0 to $\frac{2}{3}$ based on the total amount of silyl groups:

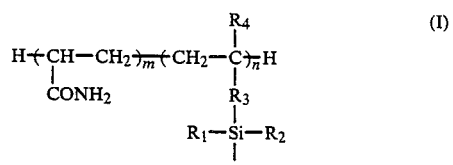
(I)

wherein each of $R_1$ and $R_2$ is a hydroxyl group, a methyl group, an ethyl group, an alkoxy group having from 1 to 3 carbon atoms, a phenoxy group, an acetoxy group, a trimethylsiloxy group, a triethylsiloxy group or an oxygen atom bonded to Si in a silanol group on the surface of the carrier, $R_3$ is a 3-carbonyloxypropyl group, a 1-phenyleneethyl group or a 2-phenyleneethyl group, $R_4$ is a hydrogen atom or a methyl group, and each of m and n is an integer of at least 1; and

(II)

wherein each of $R_1$ and $R_2$ is a hydroxyl group, a methyl group, an ethyl group, an alkoxy group having from 1 to 3 carbon atoms, a phenoxy group, an acetoxy group, a trimethylsiloxy group, a triethylsiloxy group or an oxygen atom bonded to Si in a silanol group on the surface of the carrier, $R_5$ is a methyl group, an ethyl group or a 3-glyceryloxypropyl group.

The present invention provides also a process for producing such a packing material for chromatography, which comprises reacting silanol groups on the surface of the carrier with an organosilane of the following formula III and an organosilane of the following formula IV in such proportions that the molar ratio of the organosilane of the formula IV is from 0 to $\frac{2}{3}$ based on the total amount of organosilanes, at a temperature of from 20° to 200° C. to form Si—O—Si bonds, followed by copolymerization with acrylamide at a temperature of from 20° to 200° C.:

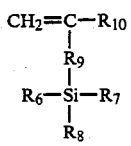
(III)

wherein each of $R_6$ and $R_7$ is a methyl group, an ethyl group, an alkoxy group having from 1 to 3 carbon atoms, a phenoxy group, an acetoxy group, a trimethylsiloxy group, a triethylsiloxy group or a halogen atom, and $R_8$ is an alkoxy group having from 1 to 3 carbon atoms, a phenoxy group, an acetoxy group or a halogen atom, $R_9$ is a 3-carbonyloxypropyl group, a 1-phenyleneethyl group, or a 2-phenyleneethyl group, and $R_{10}$ is a hydrogen atom or a methyl group; and

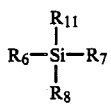
(IV)

wherein each of $R_6$ and $R_7$ is a methyl group, an ethyl group, an alkoxy group having from 1 to 3 carbon atoms, a phenoxy group, an acetoxy group, a trimethylsiloxy group, a triethylsiloxy group or a halogen atom, $R_8$ is an alkoxy group having from 1 to 3 carbon atoms, a phenoxy group, an acetoxy group or a halogen atom, and $R_{11}$ is a methyl group, an ethyl group or a 3-glycidoxypropyl group. Now, the present invention will be described in detail with reference to the preferred embodiments.

BRIEF DESCRIPTION OF THE DRAWING

In the accompanying drawing, FIG. 1 is a difference infrared spectrum chart of the packing material of the present invention obtained in Example 6 and the silica gel carrier as the starting material.

As the carrier to be used in the present invention, silica gel, porous glass, diatomaceous earth or high silica zeolite may be mentioned. In order to densely cover its surface with the organosilane and further to form a polymer layer wherein acrylamide is bonded to the organosilane, the carrier preferably has at least one silanol group/nm$^2$, more preferably at least two silanol groups/nm$^2$, on its surface. The carrier may have any optional shape. However, a spherical shape is preferred particularly for liquid chromatography. The carrier preferably has a particle size of from 1 to 500 μm, more preferably from 1.5 to 200 μm. In the case of a carrier having pores, it preferably has an average size of at least 30 Å.

The copolymer covering the surface of the carrier of the present invention is represented by the formula I, which is bonded to Si in the silanol groups on the surface of the carrier by a Si—O—Si bond. The copolymer is the one formed by the polymerization of the vinyl group portion of the vinyl group-containing organosilane of the formula III with the vinyl group portion of acrylamide, whereby an excellent hydrophilic carrier durable against a water-containing eluting solution system can be formed.

Further, the cover for the carrier need not necessarily be composed solely of said copolymer, and so long as said copolymer can adequately cover the surface of the carrier, a silyl group of the formula II may be bonded by a Si—O—Si bond to a silanol group on the surface of the carrier. The molar ratio of the silyl group of the formula II must be within a range of from 0 to ⅔ based on the total silyl groups. If the molar ratio exceeds ⅔, the cover by said copolymer will be inadequate, such being undesirable.

With respect to the 3-carbonyloxypropyl group, the 1-phenyleneethyl group or the 2-phenyleneethyl group for $R_3$ in the formula I or for $R_9$ in the formula III, the propyl group or the ethyl group is bonded to Si in the organosilane, and the carbonyl or the phenylene is bonded to the carbon atom which is bonded to $R_4$ or $R_{10}$.

The packing material of the present invention can be obtained by reacting silanol groups on the surface of the carrier and the organosilane to form Si—O—Si bonds, followed by copolymerization with acrylamide.

As the vinyl group-containing organosilane, it is common to employ an organosilane of the formula III. The organosilane of the formula III includes, for example, styrylethyltrimethoxysilane, methacryloxypropyldimethylchlorosilane, 3-methacryloxypropylmethyldiethoxysilane, 3-methacryloxypropyltrimethoxysilane, 3-methacryloxypropyltris(methoxyethoxy)silane, 3-acryloxypropyltrimethoxysilane, 3-acryloxypropylmethyldimethoxysilane.

As another organosilane having no vinyl group, a functional group having a strong hydrophobic nature is undesirable, and it is common to employ an organosilane of the formula IV. The organosilane of the formula IV includes, for example, 3-glycidoxypropyldimethylethoxysilane, 3-glycidoxypropylmethyldiethoxysilane, 3-glycidoxypropyltrimethoxysilane, methylbromodichlorosilane, methyldimethoxychlorosilane, methyltriethoxysilane, methyltriacetoxysilane, dimethyldiethoxysilane, triethylchlorosilane, methoxyethylmethyldichlorosilane, trimethylchlorosilane, trimethyl-n-propoxysilane, and trimethyldisilane.

In the present invention, for the formation of Si—O—Si bonds by the reaction of silanol groups on the surface of the carrier with such organosilanes, a conventional method may be employed. The proportions of the organosilane having a vinyl group and the organosilane having no vinyl group are such that the organosilane having no vinyl group must be present in a molar ratio of not higher than ⅔ relative to the total amount of silanes. Within the range of such proportions, the vinyl group-containing organosilane alone, or the vinyl group-containing organosilane and the organosilane having no vinyl group together or separately, may be reacted to the silanol groups of the carrier. It is preferred to employ a solvent from the viewpoint of the reproducibility of the reaction or operation efficiency. However, the reaction may be conducted in the absence of a solvent.

The solvent may be any solvent so long as it is capable of dissolving the organosilanes and inert to the carrier and to the organosilanes. For examples, ethers such as n-butyl ether, ethylene glycol dimethyl ether, diethylene glycol dimethyl ether, tetrahydrofuran and dioxane, hydrocarbons such as toluene, xylene and n-hexane, halogenated hydrocarbons such as chlorobenzene and dibromobutane, amides such as dimethylformamide, diethylacetamide, and N-methylpyrrolidone, and sulfoxides such as dimethylsulfoxide, may be used alone or in combination as a mixture.

When the reaction temperature is low, the reaction rate is slow, and the amount of the organosilanes bonded will be inadequate. On the contrary, if the reaction temperature is high, polymerization of the unsaturated organic groups by heat is likely to take place. Therefore, the reaction is conducted usually within a temperature range of from 20° to 200° C., preferably from 40° to 150° C.

In order to prevent the progress of the polymerization reaction during the bonding of the organosilanes, a polymerization inhibitor may be added in an amount of not higher than 1% relative to the amount of the organosilanes. As such a polymerization inhibitor, a phenol or a hydroquinone commonly employed, may be used.

The amount of the organosilane relative to the porous carrier depends on the amount of silanol groups present in the carrier. The organosilane having an unsaturated organic group to be used in the present invention is capable of bonding only in an amount of 4 $\mu$mol/m$^2$ at best, and therefore, the organosilane may be used in an amount of at least (surface area m$^2$ of the carrier)$\times$(4 $\mu$mol/m$^2$).

Then, the silane-treated carrier obtained by the above reaction is copolymerized with acrylamide. As a method for this copolymerization, there may be employed a method wherein acrylamide and a polymerization initiator are supported on the surface of the silane-treated carrier, followed by suspension polymerization in a solvent in which acrylamide is insoluble or by polymerization under heating in the absence of a solvent, or a method wherein the carrier, acrylamide and a polymerization initiator are mixed in a solvent in which acrylamide is soluble, followed by polymerization. There is no particular restriction to the initiator to be used here. An initiator commonly used for the polymerization of acrylamide such as a peroxide, an azo compound or a redox initiator may be employed.

The solvent capable of dissolving acrylamide and useful for the polymerization includes water and water-soluble organic solvents such as methanol, ethanol, isopropyl alcohol, acetonitrile, ethylene glycol, diethylene glycol, glycerol, methylcarbitol, dimethylformamide, dimethylacetamide, dimethylsulfoxide, dioxane and acetone, and mixtures thereof.

The solvent in which acrylamide is insoluble and which is useful for suspension polymerization of the acrylamide-supported silane-treated carrier, includes hydrophobic solvents such as n-hexane, kerosine, n-paraffin, benzene, toluene, xylene, methyl isobutyl ketone, 1,1-trichloroethane, carbon tetrachloride, dibutyl ether and chlorobenzene, and solvent mixtures thereof.

In the above copolymerization reaction, the polymerization may proceed at low temperatures, but the reaction rate will usually be too slow to be practical. On the other hand, at high temperatures, various side reactions are likely to take place, and the life of generated radicals tends to be short, whereby crosslinking among organosilanes tends to be inadequate. Accordingly, the life of the packing material in an aqueous solvent will be short, or irreversible adsorption will be caused, such being undesirable. Specifically, the copolymerization is conducted usually within a temperature range of from 20° to 200° C. The temperature is selected primarily depending on the type of the initiator. The copolymerization is preferably conducted within a range of from 30° to 150° C.

The packing material thus obtained contains polyacrylamide not chemically bonded to the packing material and unreacted monomer. Such polymer and monomer are soluble in water and can readily be removed by washing.

The packing material of the present invention has excellent properties as a packing material for aqueous gel permeation chromatography or for normal phase partition chromatography, as compared with the conventional carriers. The features as the packing material for aqueous gel permeation chromatography include the low adsorbing properties and the capability of providing highly reproducible data. Namely, the interaction between the carrier surface and the solute is minimal, since the porous surface of the carrier is covered with a layer of polyacrylamide which is a hydrophilic polymer. Further, since the polymer layer is bonded to the silica gel by numerous siloxane bonds, the organic stationary phase will be scarcely released from the carrier even by the hydrolysis of siloxane bonds or by the equilibrium reaction of dehydration and condensation which take place in the water-containing solution. Thus, highly reproducible results of measurement can be obtained eve when the packing material is used in a water-containing solution for a long period of time. Yet, the base material for the carrier may be silica gel or porous glass which is an inorganic carrier prepared by a conventional method. Such a carrier is a hard porous material which usually has a pore size distribution narrower than that of an organic polymer carrier and which undergoes no substantial change in the swelling degree due to a change of the solvent. Thus, it can be used in the form of fine particles, whereby high resolution (or performance) can be obtained and high speed separation will readily be possible. The pore size depends on the carrier as the base material. The base materials having various pore sizes can be prepared by conventional methods. Thus, the hydrophilic carrier obtained by the present invention is extremely effective as a packing material for aqueous gel permeation chromatography for the separation based on the molecular sieve effect in an aqueous solution system of e.g. proteins, polypeptides, nucleic acids, nucleotides, saccharides or water-soluble synthetic polymers.

On the other hand, similar features are utilized also as a packing material for normal phase partition chromatography. It is excellent in the resolution and in the reproducibility particularly for the separation of polyols or saccharides by normal phase partition chromatography in a water-containing solvent system. Also in a known-aqueous solvent system, it exhibits a performance substantially equal to that of conventional inorganic carrier-base packing materials.

Now, the present invention will be described in further detail with reference to Examples. However, it should be understood that the present invention is by no means restricted to such specific Examples. In the Examples, "parts" means "parts by weight".

EXAMPLE 1

Silica gel used as the base material had the following physical properties.

Shape: spherical, particle size: 8-12 $\mu$m,
specific surface area: 250 m$^2$/g,
average pore size: 250 Å.

This silica gel was dried in a reduced pressure drier at 80° C. under 10 mmHg for 16 hours. To 10 parts of this dried silica gel, 2 parts of 3-acryloxypropyltrimethoxysilane, 50 parts of toluene, 0.01 part of phenol and 4 parts of diethylaminoethanol were mixed, and the mixture was reacted at 75° C. for 3 hours. The resulting silane-treated silica gel was collected by filtration, then washed twice with 50 parts of toluene and then three times with 50 parts of methanol and dried under reduced pressure at 30° C. for 16 hours. 10 parts of the silane-treated silica gel thus obtained was suspended in 50 parts of a 25% methanol aqueous solution, and 1 part of acrylamide and 0.1 part of potassium persulfate were added thereto. The reaction system was flushed with nitrogen, then heated to 60° C. and polymerized for 6 hours. The carrier thus obtained was collected by filtration and repeatedly washed with water to remove polyacrylamide not bonded to the carrier. The packing material thus obtained was packed into a stainless steel column having an inner diameter of 7.5 mm and a length of 30 cm by a slurry-packing method, and its properties as a packing material for gel permeation chromatography in an aqueous solvent system were examined under the following conditions:

Apparatus:

Pump: CCPD high pressure pump, detector: RI-8 (differential refractometer), UV-8 (ultraviolet absorption meter 280 nm), all manufactured by TOSOH CORPORATION Conditions for measurement:

Eluent: water or 20 mM phosphate buffer solution (pH 7.0, containing 0.1 M sodium chloride), flow rate: 1 ml/min, amount of the loading sample: 0.1% 50 μl (proteins), 0.1–0.5% 50 μl (others)

Firstly, a mixture of dextrane (MW: about 500,000, Dextrane T-500, manufactured by Pharmacia AB) and ethylene glycol was measured by using water as the eluent, and the gel capacity was obtained.

(Gel capacity)=(Eluted amount of ethylene glycol)−(Eluted amount of Dextrane T-500)/(Eluted amount of Dextrane T-500)

The gel capacity here was 1.20.

Then, the elution volumes and the recovery rates of various proteins were measured by using the phosphate buffer solution as the eluent. The eluent was permitted to flow under the same condition for a further 200 hours, and the elution volumes and the recovery rates of various proteins were again measured. The results are shown in Table 1. The recovery rate is represented by a percentage of the sum of the surface areas of the peaks (main peaks and peaks of impurities) of ultraviolet absorption by proteins when the sample is passed through the packed column and the surface areas of the peaks of ultraviolet absorption by proteins when the sample is passed through a stainless steel column having an inner diameter of 0.6 mm and a length of 3.7 m. The measurement was repeated three times, and the average of the measured values was obtained.

The results of the analysis of the composition in the dried state of the carrier after the silane-treatment and of the carrier after the copolymerization reaction in the present Example are shown below.

|  | C % | H % | N % | SiO$_2$ % | Others % |
|---|---|---|---|---|---|
| After silane treatment: | 5.6 | 1.2 | less than 0.3 | 91.4 | 1.8 |
| After copoly- | 9.3 | 1.5 | 2.0 | 84.0 | 3.2 |

-continued

|  | C % | H % | N % | SiO$_2$ % | Others % |
|---|---|---|---|---|---|
| merization: | | | | | |

COMPARATIVE EXAMPLE 1

To 10 parts of the same silica gel as used in Example 1, 3 parts of 3-glycidoxypropyltrimethoxysilane and 50 parts of toluene were mixed, and the mixture was reacted at 100° C. for 3 hours. The treated silica gel was collected by filtration and washed once with 50 parts of toluene, then twice with 50 parts of acetone and further twice with 50 parts of pure water. The silane-treated silica gel thus obtained was mixed with 100 parts of an aqueous solution of hydrochloric acid (pH: 3.0), and the mixture was reacted at 40° C. for 3 hours to subject the epoxy group of the 3-glycidyloxypropyl group to hydrolysis for ring-opening. The product was washed with water and then with methanol and dried under reduced pressure. The carrier thus obtained was packed in a wet system in the same column as used in Example 1, and the eluted amounts of proteins were measured under the same condition as in Example 1. The results are shown in Table 1.

COMPARATIVE EXAMPLE 2

To 10 parts of the same silica gel as used in Example 1, 3 parts of 3-glycidoxypropyltrimethoxysilane, 0.5 part of 3-methacryloxypropyltrimethoxysilane, 50 parts of toluene and 0.01 part of phenol were mixed, followed by silane treatment and copolymerization with acrylamide in the same manner as in Example 1. The carrier thus obtained was subjected to the ring-opening of the remaining epoxy group in an aqueous hydrochloric acid solution in the same manner as in Example 1, and the carrier thus obtained was packed in a column in the same manner as in Example 1, and the elution volumes of proteins were measured under the same condition as in Example 1. The results are likewise shown in Table 1.

EXAMPLES 2 TO 4

By using the same silica gel as used in Example 1 and various organosilanes, catalysts and solvents as identified in Table 2, the reaction was conducted under the same condition as in Example 1 to obtain carriers. The carbon and nitrogen contents in each carrier are shown in Table 2. Each carrier was packed in the same column as used in Example 1, and the recovery rates of proteins (human serum γ-globulin, egg albumin, cytochrome C) were determined under the same condition as in Example 1. The results are shown in Table 2. However, in Example 3, the reaction temperature for the silane treatment was 50° C., which was different from the reaction temperature in Example 1.

EXAMPLE 5

To 10 parts of the same silica gel as used in Example 1, 2 parts of styrylethyltrimethoxysilane, 2 parts of 3-glycidoxypropylmethyldiethoxysilane, 50 parts of toluene and 0.01 part of phenol were mixed, and the mixture was reacted at 110° C. for 3 hours. The silane-treated silica gel thus obtained was collected by filtration, washed twice with 50 parts of toluene and then three times with 50 parts of methanol and dried under reduced pressure at 40° C. Then, 10 parts of the dried gel thus obtained was mixed with 0.2 part of 2,2'-azobis- (isobutylamide)dihydrate, 2 parts of acrylamide and 40 parts of a 90% methanol aqueous solution, and then the solvent was removed under reduced pressure. The carrier thus obtained was suspended in xylene and reacted for polymerization at 80° C. for 6 hours. The product was collected by filtration and washed three times with 50 parts of acetone and then thoroughly washed with water. The carrier thus obtained was mixed with 100 parts of an aqueous hydrochloric acid solution (pH 3), and the mixture was reacted at 40° C. for 3 hours to subject the epoxy group in the 3-glycidoxypropyl group to ring-opening. The carrier thus obtained was packed in a column in the same manner as in Example 1, and the measurement of proteins were conducted under the same condition as in Example 1. The results are shown in Table 1.

The results of the analysis of the composition in a dried state of the carrier thus obtained are shown below.

|  | C % | H % | N % | $SiO_2$ % | Others % |
|---|---|---|---|---|---|
| Packing material of Example 5 | 10.2 | 1.5 | 2.0 | 82.0 | 3.3 |

TABLE 1

| | | Sample (molecular weight) | | | | |
|---|---|---|---|---|---|---|
| | | Thyroglobulin (670,000) | Human serum albumin (68,000) | Egg albumin (43,000) | Cytochrome C (13,000) | Lysozyme (14,000) |
| | | Initial measurement | | | | |
| Example 1 | Elution volume (ml) | 5.2 | 8.3 | 8.9 | 10.6 | 10.9 |
| | Recovery rate (%) | >99 | >99 | >99 | >99 | >99 |
| Example 5 | Elution volume (ml) | 5.3 | 8.3 | 9.0 | 10.7 | 11.5 |
| | Recovery rate (%) | >95 | >98 | >99 | >99 | >99 |
| Comparative Example 1 | Elution volume (ml) | 5.1 | 8.2 | 8.9 | 10.7 | 11.2 |
| Comparative Example 2 | Elution volume (ml) | 5.2 | 8.3 | 9.0 | 10.7 | 11.1 |
| | | Measurements after running | | | | |
| Example 1 | Elution volume (ml) | 5.2 | 8.3 | 8.9 | 10.6 | 10.9 |
| | Recovery rate (%) | >99 | >99 | >99 | >99 | >99 |
| Example 5 | Elution volume (ml) | 5.3 | 8.3 | 9.0 | 10.7 | 11.5 |
| | Recovery rate (%) | >95 | >98 | >99 | >99 | >99 |
| Comparative Example 1 | Elution volume (ml) | 5.0 | 8.1 | 8.8 | 12.8 | 18.8 |
| Comparative Example 2 | Elution volume (ml) | 5.1 | 8.2 | 8.9 | 11.5 | 14.0 |

TABLE 2

| | Organosilane treatment | | Copolymerization reaction | | Content in dry carrier | | Protein recovery rate (%) | | |
|---|---|---|---|---|---|---|---|---|---|
| | Organosilane | Solvent | Catalyst | Solvent | C % | N % | Human γ-globulin | Egg albumin | Cytochrome C |
| Example 2 | 3-Methacyl-oxypropyl-trimethoxy-silane 3 parts | Toluene | 2,2-Azobis-(isobutyl-amide) dihydrate 0.2 part | 25% Methanol aqueous solution | 8.9 | 1.9 | >99 | >99 | >99 |
| Example 3 | 3-Acryloxy-propyltri-methoxy-silane 2 parts Trimethyl-chlorosilane 1 parts | Benzene | Potassium persulfate 0.1 part | 20% Ethanol aqueous solution | 8.6 | 1.6 | >99 | >99 | >99 |
| Example 4 | 3-Methacryl-oxypropyl-methyldi-ethoxysilane 3 parts | Xylene | Potassium persulfate 0.1 part | 10% 1,4-dioxane aqueous solution | 9.2 | 1.8 | >99 | >99 | >99 |

EXAMPLE 6

The physical properties of silica gel used as the substrate were as follows:
Shape: spherical, particle size: 6–9 μm,
specific surface area: 330 m²/g,
average pore size: 100 Å

This silica gel was dried in a reduced pressure drier at 80° C. under 10 mmHg for 16 hours. To 10 parts of the dried silica gel, 2 parts of 3-methacryloxypropyltrimethoxysilane, 50 parts of toluene and 0.1 part of phenol were mixed, and the mixture was reacted at 80° C. for 3 hours. The silane-treated silica gel was collected by filtration, then washed twice with 50 parts of toluene and then three times with 50 parts of methanol and dried under reduced pressure at 30° C. for 16 hours. 10 Parts of the silane-treated silica gel thus obtained was suspended in 100 parts of a 25% methanol aqueous solution, and 12 parts of acrylamide and 0.2 part of potassium persulfate were added thereto. The reaction system was flushed with nitrogen, then heated to 60° C. and reacted for 8 hours. Water was added to the carrier suspension thus obtained, and the carrier was separated by centrifugal sedimentation and repeatedly washed with water to remove polyacrylamide not fixed to the carrier. The packing material thus obtained was packed in a stainless steel column having an inner diameter of 4.6 mm and a length of 25 cm, and the properties as a packing material for normal phase partition chromatography were examined under the following condition. The apparatus was the same as used in Example 1.

The condition for measurement:

Eluent: mixture of acetonitrile and water (volume ratio: 75/25, flow rate: 1.0 ml/min, amount of the loading sample: 0.2%, 20 μl, sample: polyols (glycerol, erythritol, xylitol, mannitol, inositol)

The eluted amounts of the polyols are 5.6 ml, 6.9 ml, 8.5 ml, 10.2 ml and 18.0 ml, respectively. The respective components were completely separated from one another. After running for 200 hours under the condition for measurement, there was no change in the eluted amount of each component, and no change in the column efficiency was observed. Thus, good data for reproducibility were obtained. The results of the analysis of the composition in a dried state of the carrier after the silane treatment and after the copolymerization reaction are shown below.

|  | C % | H % | N % | SiO$_2$ % | Others % |
|---|---|---|---|---|---|
| After silane treatment: | 6.0 | 1.1 | less than 0.3 | 89.7 | 3.0 |
| After copolymerization: | 12.2 | 2.0 | 2.4 | 80.6 | 2.8 |

The difference spectrum of infrared absorption analyses of the carrier and the silica gel substrate after the copolymerization was measured, whereby absorption at 3,200 cm$^{-1}$ attributable to hydrogen bond N—H, at 2,950 cm$^{-1}$ attributable to aliphatic C—H at 1,675 cm$^{-1}$ attributable to C=O of an amide, at 1,610 cm$^{-1}$ attributable to NH$_2$ of an amide and at 1,320 cm$^{-1}$ attributable to C—N was observed, which indicates that the organic stationary phase comprises polyacrylamide as the main constituting units. The infrared spectrum is shown in FIG. 1.

COMPARATIVE EXAMPLE 3

To 10 parts of the same silica gel as used in Example 6, 4 parts of 3-aminopropyltriethoxysilane and 50 parts of toluene were mixed, and the mixture was reacted at 90° C. for 3 hours. The treated silica gel was collected by filtration and washed once with 50 parts of toluene and three times with 50 parts of acetone. The packing material thus obtained was packed in the same column as used in Example 6, and the eluted amounts of polyols were measured by using the same apparatus under the same condition as in Example 6. The eluted amounts of glycerol, erythritol, xylitol, mannitol and inositol immediately after the packing were 5.1 ml, 6.1 ml, 7.4 ml, 8.7 ml and 15.0 ml, respectively. However, after running for 72 hours under the condition for measurement, eluted amounts of the respective polyols were 4.0 ml, 4.6 ml, 5.2 ml, 5.9 ml and 9.0 ml, respectively, although no substantial change in the column efficiency was observed.

We claim:

1. A packing material for chromatography comprising a carrier having silanol groups on its surface, wherein Si in the silanol groups forms a Si—O—Si bond together with Si in a silyl group of the following formula I and Si in a silyl group of the following formula II, and the molar ratio of the silyl group of the formula II is from 0 to ⅔ based on the total amount of silyl groups:

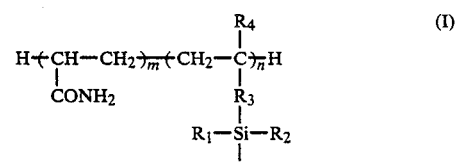

wherein each of R$_1$ and R$_2$ is a hydroxyl group, a methyl group, an ethyl group, an alkoxy group having from 1 to 3 carbon atoms, a phenoxy group, an acetoxy group, a trimethylsiloxy group, a triethylsiloxy group or an oxygen atom bonded to Si in a silanol group on the surface of the carrier, R$_3$ is a 3-carbonyloxypropyl group, a 1-phenyleneethyl group or a 2-phenyleneethyl group, R$_4$ is a hydrogen atom or a methyl group, and each of m and n is an integer of at least 1; and

wherein each of R$^1$ and R$_2$ is a hydroxyl group, a methyl group, an ethyl group, an alkoxy group having from 1 to 3 carbon atoms, a phenoxy group, an acetoxy group, a trimethylsiloxy group, a triethylsiloxy group or an oxygen atom bonded to Si in a silanol group on the surface of the carrier, R$_5$ is a methyl group, an ethyl group or a 3-glyceryloxypropyl group.

2. The packing material according to claim 1, wherein the carrier has at least one silanol group/nm$^2$ on its surface.

3. The packing material according to claim 1, wherein the carrier is spherical porous particles having a particle size of from 1 to 500 μm and an average pore size of at least 30 Å.

4. A process for producing a packing material for chromatography, which comprises reacting silanol groups on the surface of a carrier with an organosilane of the following formula III and an organosilane of the following formula IV in such proportions that the molar ratio of the organosilane of the formula IV is from 0 to ⅔ based on the total amount of organosilanes, at a temperature of from 20° to 200° C. to form Si—O—Si bonds, followed by copolymerization with acrylamide at a temperature of from 20° to 200° C.:

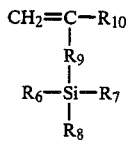
(III)

wherein each of $R_6$ and $R_7$ is a methyl group, an ethyl group, an alkoxy group having from 1 to 3 carbon atoms, a phenoxy group, an acetoxy group, a trimethylsiloxy group, a triethylsiloxy group or a halogen atom, and $R_8$ is an alkoxy group having from 1 to 3 carbon atoms, a phenoxy group, an acetoxy group or a halogen atom, $R_9$ is a 3-carbonyloxypropyl group, a 1-phenyleneethyl group, or a 2-phenyleneethyl group, and $R_{10}$ is a hydrogen atom or a methyl group; and

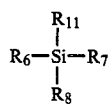
(IV)

wherein each of $R_6$ and $R_7$ is a methyl group, an ethyl group, an alkoxy group having from 1 to 3 carbon atoms, a phenoxy group, an acetoxy group, a trimethylsiloxy group, a triethylsiloxy group or a halogen atom, $R_8$ is an alkoxy group having from 1 to 3 carbon atoms, a phenoxy group, an acetoxy group or a halogen atom, and $R_{11}$ is a methyl group, an ethyl group or a 3-glycidoxypropyl group.

5. The process according to claim 4, wherein the organosilane of the formula III is selected from the group consisting of
styrylethyltrimethoxysilane,
methacryloxypropyldimethylchlorosilane,
3-methacryloxypropylmethyldiethoxysilane,
3-methacryloxypropyltrimethoxysilane,
3-methacryloxypropyltris(methoxyethoxy)silane,
3-acryloxypropyltrimethoxysilane,
3-acryloxypropylmethyldimethoxysilane.

6. The process according to claim 4, wherein the organosilane of the formula IV is selected from the group consisting of
3-glycidoxypropyldimethylethoxysilane,
3-glycidoxypropylmethyldiethoxysilane,
3-glycidoxypropyltrimethoxysilane,
methylbromodichlorosilane,
methyldimethoxychlorosilane,
methyltriethoxysilane,
methyltriacetoxysilane,
dimethyldiethoxysilane,
triethylchlorosilane,
methoxyethylmethyldichlorosilane,
trimethylchlorosilane,
trimethyl-n-propoxysilane, and
trimethyldisilane.

7. The process according to claim 4, wherein the organosilane of the formula III is used in an amount of at least 4 $\mu$mol per m$^2$ of the surface area of the carrier.

8. The process according to claim 4, wherein the reaction is conducted at a temperature of from 40° to 150° C., and the copolymerization is conducted at a temperature of from 30° to 150° C.

* * * * *